(12) United States Patent
Lahann et al.

(10) Patent No.: US 7,947,148 B2
(45) Date of Patent: May 24, 2011

(54) DRY ADHESION BONDING (75) Inventors: Joerg Lahann, Ann Arbor, MI (US); Hsien-Yeh Chen, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 925 days.

(21) Appl. No.: 11/756,890

(22) Filed: Jun. 1, 2007

(65) Prior Publication Data
US 2007/0281126 A1 Dec. 6, 2007

Related U.S. Application Data (60) Provisional application No. 60/810,101, filed on Jun. 1, 2006.

(51) Int. Cl.
*B32B 5/00* (2006.01)
(52) U.S. Cl. .................. 156/310; 156/272.2; 427/255.28
(58) Field of Classification Search .................. 156/310, 156/272.2; 106/285, 287.23; 427/255.28, 427/585
See application file for complete search history.

(56) References Cited

U.S. PATENT DOCUMENTS

| | | | |
|---|---|---|---|
| 4,746,347 A | 5/1988 | Sensi | |
| 4,792,536 A | 12/1988 | Pecoraro et al. | |
| 5,171,132 A | 12/1992 | Miyazaki et al. | |
| 5,240,886 A | 8/1993 | Gulotta et al. | |
| 5,271,724 A | 12/1993 | van Lintel | |
| 5,277,556 A | 1/1994 | van Lintel | |
| 5,375,979 A | 12/1994 | Trah | |
| 5,385,872 A | 1/1995 | Gulotta et al. | |
| 5,393,593 A | 2/1995 | Gulotta et al. | |
| 5,776,748 A | 7/1998 | Singhvi et al. | |
| 5,858,188 A | 1/1999 | Soane et al. | |
| 5,869,135 A | 2/1999 | Vaeth et al. | |
| 5,935,409 A | 8/1999 | King et al. | |
| 6,074,725 A | 6/2000 | Kennedy | |
| 6,086,679 A | 7/2000 | Lee et al. | |
| 6,103,479 A | 8/2000 | Taylor | |
| 6,192,168 B1 | 2/2001 | Feldstein et al. | |
| 6,291,072 B1 | 9/2001 | Kimoto et al. | |
| 6,473,696 B1 | 10/2002 | Onyia et al. | |
| 6,475,928 B1 * | 11/2002 | Berenguer et al. | 438/776 |

(Continued)

FOREIGN PATENT DOCUMENTS

DE 19604173 8/1997

(Continued)

OTHER PUBLICATIONS

Non-Final Office Action for U.S. Appl. No. 12/054,171 (U.S. Pub. No. 2008/0269456) dated Jul. 22, 2009.

(Continued)

*Primary Examiner* — Richard Crispino
*Assistant Examiner* — Daniel McNally
(74) *Attorney, Agent, or Firm* — Harness, Dickey & Pierce, P.L.C.

(57) ABSTRACT

Methods for bonding include deposition an adhesion layer on at least one substrate using chemical vapor deposition. The two adhesion layers each have a reactive group that is complementary to the other, thus enabling strong adhesion between the bonded substrates. Devices include two substrates that can be adhered together by chemically depositing an adhesion layer on at least one substrate using chemical vapor deposition. The substrates each have a reactive group that is complementary to the other, thus enabling strong adhesion between the bonded substrates.

20 Claims, 2 Drawing Sheets

U.S. PATENT DOCUMENTS

| | | | |
|---|---|---|---|
| 6,712,846 B1 | 3/2004 | Kraus et al. | |
| 6,751,558 B2 | 6/2004 | Huffman et al. | |
| 6,942,771 B1 | 9/2005 | Kayyem | |
| 6,977,138 B2 | 12/2005 | Lahann et al. | |
| 6,977,866 B2 | 12/2005 | Huffman et al. | |
| 7,020,355 B2 | 3/2006 | Lahann et al. | |
| 7,217,356 B2 | 5/2007 | Cork et al. | |
| 7,648,739 B2 | 1/2010 | Lahann et al. | |
| 2003/0044546 A1* | 3/2003 | Lahann et al. | 427/509 |
| 2005/0064027 A1 | 3/2005 | Jacob et al. | |
| 2005/0118595 A1 | 6/2005 | Lahann | |
| 2005/0276835 A1 | 12/2005 | Lahann et al. | |
| 2006/0064740 A1 | 3/2006 | Kelley et al. | |
| 2006/0127562 A1* | 6/2006 | Lewis et al. | 427/58 |
| 2006/0187325 A1 | 8/2006 | Laue et al. | |
| 2006/0192281 A1 | 8/2006 | Lu et al. | |
| 2006/0201390 A1 | 9/2006 | Lahann et al. | |
| 2006/0294588 A1 | 12/2006 | Lahann et al. | |
| 2007/0237800 A1 | 10/2007 | Lahann | |
| 2007/0272122 A1 | 11/2007 | Lahann et al. | |
| 2007/0281126 A1 | 12/2007 | Lahann et al. | |
| 2008/0242774 A1 | 10/2008 | Lahann et al. | |
| 2008/0269456 A1 | 10/2008 | Lahann et al. | |
| 2009/0118819 A1 | 5/2009 | Merz et al. | |
| 2010/0015447 A1 | 1/2010 | Lahann et al. | |
| 2010/0038830 A1 | 2/2010 | Lahann et al. | |
| 2010/0068810 A1 | 3/2010 | Smith et al. | |
| 2010/0145422 A1 | 6/2010 | Seymour et al. | |

FOREIGN PATENT DOCUMENTS

| | | |
|---|---|---|
| EP | 0519087 | 12/1992 |
| WO | WO 99/30823 | 6/1999 |
| WO | WO 99/40174 | 8/1999 |
| WO | WO 00/04389 | 1/2000 |
| WO | WO 00/04390 | 1/2000 |
| WO | WO 00/53625 | 9/2000 |
| WO | WO 00/60356 | 10/2000 |
| WO | WO 01/07891 | 2/2001 |
| WO | WO 02094454 A1 * | 11/2002 |
| WO | WO 2004016672 A2 * | 2/2004 |

OTHER PUBLICATIONS

Response filed on Oct. 22, 2009 to Non-Final Office Action dated Jul. 22, 2009 for U.S. Appl. No. 12/054,171 (U.S. Pub. No. 2008/0269456).

Final Office Action for U.S. Appl. No. 12/054,171 (U.S. Pub. No. 2008/0269456) dated Jan. 6, 2010.

Response filed on Apr. 1, 2010 to Final Office Action dated Jan. 6, 2010 for U.S. Appl. No. 12/054,171 (U.S. Pub. No. 2008/0269456).

Advisory Action for U.S. Appl. No. 12/054,171 (U.S. Pub. No. 2008/0269456) dated Apr. 7, 2010.

Request for Continued Examination filed on May 6, 2010 for U.S. Appl. No. 12/054,171 (U.S. Pub. No. 2008/0269456).

Non-Final Office Action for U.S. Appl. No. 11/691,210 (U.S. Pub. No. 2007/0272122) dated Feb. 12, 2010.

Response filed on Mar. 15, 2010 to Non-Final Office Action dated Feb. 12, 2010 for U.S. Appl. No. 11/691,210 (U.S. Pub. No. 2007/0272122).

Non-Final Office Action for U.S. Appl. No. 11/691,210 (U.S. Pub. No. 2007/0272122) dated May 5, 2010.

Response filed on Aug. 4, 2010 to Non-Final Office Action dated May 5, 2010 for U.S. Appl. No. 11/691,210 (U.S. Pub. No. 2007/0272122).

Elkasabi, Yaseen. et al., "Vapor-Based Polymer Gradients," Macromolecular Rapid Communications, vol. 30, pp. 57-63 (2009).

Elkasabi, Yaseen. et al., "Chemical vapor deposition co-polymerization of functionalized [2.2]paracyclophanes," Poster No. 142al presented at AIChE Annual Meeting, Cincinnati, OH (Oct. 31, 2005).

Elkasabi, Yaseen et al., "Multipotent Polymer Coatings Based on Chemical Vapor Deposition Copolymerization", Adv. Mater., vol. 18, Issue 12, pp. 1521-1526 (2006).

Lahann, Joerg et al., "Bioactive immobilization of r-hirudin on CVD-coated metallic implant devices", Biomaterials, vol. 22, pp. 817-826 (2001).

Lahann, Joerg et al., "Microengineered Surfaces for Biomedical Applications Based on a Polymeric Active Ester", Polymer Reprints, Am. Chem. Soc., vol. 42, No. 2, pp. 113-114 (2001).

Lahann, Joerg, "Vapor-based polymer coatings for potential biomedical applications", Polym. Int., vol. 55, pp. 1361-1370 (2006).

Lahann, Jorg et al., "Chemical vapour deposition polymerization of substituted [2.2]paracyclophanes", Macromol. Rapid Commun., vol. 19, pp. 441-444 (1998).

Lahann, Jorg et al., "Synthesis of Amino [2.2]paracyclophanes—Beneficial Monomers for Bioactive Coating of Medical Implant Materials", Agnew. Chem. Int. Ed., vol. 40, No. 4, pp. 726-728 (2001).

Lahann, Jorg, "Reactive Polymer Coatings for Biomimetic Surface Engineering", Chem. Eng. Comm., vol. 193, Issue 11, pp. 1457-1468 (2006).

Nandivada, H. et al., "Click Chemistry: Versatility and Control in the Hands of Materials Scientists," Adv. Mater., vol. 19, Issue 17, pp. 2197-2208 (2007).

Nandivada, H. et al., "Reactive Polymer Coatings that 'Click'," Angewandte Chemie International Edition, vol. 45, Issue 20, pp. 3360-3363 (2006).

* cited by examiner

DRY ADHESION BONDING

CROSS-REFERENCE TO RELATED APPLICATIONS

This application claims the benefit of U.S. Provisional Application No. 60/810,101, filed on Jun. 1, 2006. The disclosure of the above referenced application is incorporated herein by reference.

GOVERNMENT SUPPORT

This invention was made with government support under DMR0449462, awarded by the National Science Foundation. The government has certain rights in the invention.

FIELD

The present disclosure relates to bonding of various substrates and other components to substrates by deposition of reactive adhesive layers using chemical vapor deposition.

BACKGROUND

The statements in this section merely provide background information related to the present disclosure and may not constitute prior art.

Polymeric elastomers, such as poly(dimethylsiloxane) or PDMS, are widely used as material for BioMEMs and have driven the needs to develop appropriate bonding technologies for its fabrication. Bonding of substrates has continuously been an important technical challenge in a range of electronic and biotechnological applications, such as the fabrication microelectromechanical systems (MEMS) or elastomeric microanalytical devices. Several bonding technologies including direct bonding, adhesive bonding, anodic bonding, solder or eutectic bonding, as well as thermocompression bonding have been established, but these methods are often limited to a specific substrates or involve the application of additional bonding chemicals or require harsh process conditions. For instance, bonding of poly(dimethylsiloxane) (PDMS), widely used in biotechnological applications, typically requires oxidative pre-activation, such as oxygen plasma or UV/ozone treatments. Upon exposure to these highly oxidative environments, silanol groups (Si—OH) are created, which can result in strong intermolecular bond formation (Si—O—Si). However, the effects of oxidative activation are only temporary due to hydrophobic recovery and must be done immediately prior to bonding. In addition, this approach is limited to a small group of substrates, such as PDMS, silicon, or glass, impeding application to hybrid devices consisting of a multiple different materials.

Three-dimensional microgeometry and a more complex device structure will be an ideal scenario for microfluidic, MEMS and BioMEMs as the development of bonding technologies will be significant to realize the potential of these microdevices. Provided herein is a novel adhesive bonding method and devices produced therefrom, for various applications using advanced reactive polymer coatings, rendering a bonding process with clean, dry, more flexible for a wide range of substrates, and even more robust in bonding strength.

Further areas of applicability will become apparent from the description provided herein. It should be understood that the description and specific examples are intended for purposes of illustration only and are not intended to limit the scope of the present disclosure.

SUMMARY

According to the principles of the present teachings, a process is provided for bonding two substrates or components to a substrate, the method includes providing a first substrate and providing a second substrate; depositing an adhesion layer upon at least a portion of the first substrate to form a first adhesion layer. The first adhesion layer has a first reactive group. Depositing an adhesion layer upon at least a portion of the second substrate to form a second adhesion layer, the second adhesion layer has a second reactive group, wherein the first and the second adhesion layers are deposited using chemical vapor deposition. Contacting the first adhesion layer with the second adhesion layer causing a reaction between the second reactive group and the first reactive group thereby providing an adhered article.

The present teachings further provide in some embodiments, a device comprising a first substrate bonded to a second substrate, an adhesion coating disposed between the first substrate and the second substrate comprising a first reactive group deposited on the first substrate. The first reactive group is chemically reacted to a second reactive group deposited on the second substrate; wherein the first reactive group and the second reactive group are deposited on the first substrate and the second substrate using chemical vapor deposition.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present technology provides a novel type of bonding technology for dry adhesion of various substrates based on CVD polymerization. In accordance with the present technology, an adhesion layer is deposited onto a substrate using a solvent-less process. This adhesion layer has reactive groups that enable bonding to a second substrate. A second adhesion layer modifies the second substrate. This second adhesion layer has reactive groups that can react with the reactive groups of the first adhesion layer and are thus complementary. The first and second adhesion layers can be different or the same. In an embodiment of this invention, at least one adhesion layer is made by chemical vapor deposition polymerization. The CVD polymerization is used to deposit poly(p-xylylene)-based coatings with reactive groups. If two substrates are to be bonded together, two different poly(p-xylylenes) with complementary chemical side groups can be chosen. While the two substrates can be independently stored for extended times and have little reactivity, they will create very strong bonding when brought in contact with each other.

In accordance with the present technology, methods are provided for dry adhesive bonding has been shown to be applicable to a wide range of materials, which does not require the application of solvent-based adhesives, nor does it require a pretreatment step immediately prior to the bonding. In some embodiments, bonding of two substrates can be achieved through the reaction between reactive polymer coatings that are applied in a solventless process namely, chemical vapor deposition, onto a substrate at an earlier process step. The two substrates having complementary binding reactive groups can be contacted with each other thus forming adhesion between the substrates. In some embodiments, the reactive coatings are stable until brought in contact at elevated temperatures, or pressure, or light, or actinic radiation.

Substrates

In the broad practice of the invention, the substrate 12 can be of any desired material having any desired characteristics, such as opaque, translucent, or transparent to visible light. By "transparent" is meant having visible light transmittance through the substrate of greater than 0% up to 100%. Alternatively, the substrate can be translucent or opaque. The term "translucent" can mean allowing electromagnetic energy (e.g., visible light) to pass through the substrate but diffusing this energy such that objects on the side of the substrate opposite to the viewer are not clearly visible.

Examples of suitable substrates include, but are not limited to, plastic substrates (such as acrylic polymers, such as polyacrylates; polyalkylmethacrylates, such as polymethylmethacrylates, polyethylmethacrylates, polypropylmethacrylates, polyurethanes; thermoplastics such as polycarbonates, polyesters (e.g., Mylar.™.) polyalkylterephthalates, such as polyethyleneterephthalate (PET), polypropyleneterephthalates, polybutyleneterephthalates, polyvinyl chloride (PVC), polyurethanes, polyethers, polyamides, polyimides, or copolymers of these thermoplastics, such as PETG (glycol-modified polyethylene terephthalate), and the like; polysiloxane containing polymers; or copolymers of any monomers that can be used for preparing these, or any mixtures thereof; metal substrates, such as, but not limited to, galvanized steel, stainless steel, copper, nickel, aluminum, superalloys, zircaloy, gold, silver, tungsten, molybdeumn, tantalum, brass; mineral susbstrates: silica, silicon, silicon dioxide, quartz, diamond, sapphire; ceramic substrates; tile substrates; glass substrates; or mixtures or combinations of any of the above.

For example, the substrate can be conventional untinted soda-lime-silica-glass, i.e., "clear glass", or can be tinted or otherwise colored glass, borosilicate glass, leaded glass, tempered, untempered, annealed, or heat-strengthened glass. The glass may be of any type, such as conventional float glass or flat glass, and may be of any composition having any optical properties, e.g., any value of visible radiation transmission, ultraviolet radiation transmission, infrared radiation transmission, and/or total solar energy transmission. Types of glass suitable for the practice of the present technology are described in, but are not to be considered as limited to, U.S. Pat. Nos. 4,746,347; 4,792,536; 5,240,886; 5,385,872; and 5,393,593. Further, the substrate can be a clear plastic and/or polymeric substrate with a coating of the invention deposited on at least a portion of the substrate's surface.

In some embodiments, the substrates can further include polymeric materials such as KOVAR, KEVLAR, KAPTON, MYLAR, polyolefins and the like. Other polymers can include hydrogels, microgels, pseudo-gels, rubber containing materials and elastomers.

In some embodiments, the substrate can further include porous materials including, without limitation, wood, ceramics, for example, silica and calcium containing ceramics, paper, and the like.

Preparation of Substrates

Prior to coating in the vapor deposition process, optional pretreatment of at least one of the substrates may be used to improve adhesion behavior. The method of choice is mainly depending on the type of substrate and all methods well known to a person skilled in the field of adhesion improvement may be applied. Especially a pretreatment with cold gas plasmas, such as oxygen, hydrogen, nitrogen, ammoniac, carbon dioxide, ethylene, acetylene, propylenes, butylenes, ethanol, acetone, sulfur dioxide or mixtures thereof have proven themselves to be advantageous in improving the adhesion behavior of the deposited polymer coatings. Methods for preparing and cleaning substrates for various applications are described in Reaction Chemistries Chemical modifications to the polymers may be made by employing any of the useful linkage chemistries known in the art, such as those described in U.S. Patent Publication No. 2005/064027 A1 to Jacob et al (Mar. 24, 2005).

In some embodiments, the adhesion layer can include poly (p-xylylene) based compounds with reactive groups ($R^1$, $R^2$, $R^3$ and $R^4$) according to reaction 1.

Where R can be any one or more of: H, $NH_2$, $(CH_2)_n NH_2$, OH, SH, $NH-NH_2$, $CO-NH-NH_2$, CCH, $N_3$, $OSO_2CF_3$, $(CH_2)_n SO_2CF_3$, $OSO_2C_5F_5$, $(CH_2)_n SO_2C_5F_5$, (epoxide),

COOX,

CHO, $(CH_2)_n CHO$, $CF_3$, $C_n F_{22n+1}$, azlactone, NHS, etc, and n=0-6, X: Me. Et, Pr, But, Phenyl, etc).

In some embodiments, the poly(p-xylylene) based compounds have reactive groups, for example, hydrogen, amino, aldehyde, ketone, ester, amine, amide, alcohol, thiol, thioisocyanate, isocyanate, hydrazine, hydrazide, phosphonate, phosphate, alcohol, hydroxyl, methoxyl, benzoyl, epoxide, acetate, carboxymethyl, anhydride, lactone, pentafluorophenol ester, trifluoroacetate, trifluoromethyl ketone, and trifuoromethanesulfonate.

In accordance with the present technology, any pair of reactive coatings, each having a reactive group with sufficient reactivity can be used. For instance amino-, alcohol-, thiol-, hydrazine-, or hydrazide-functionalized coatings can be reacted with carbonyl or carboxyl-containing coatings including anhydrides, aldehydes, esters, ketones, isocyanates, epoxide, acids, thioisocyantes, etc. Alternatively, alkines can be reacted with azides or other moieties that can undergo cycloaditions. In another embodiment, light reactive groups, as present in the benzoyl-functionalized poly(p-xylylenes), can be used for bonding as well. In this embodiment, activation may occur through exposure to ambient light or through light of a specific wavelength or wavelengths range. In cases, treatment of the bonding system with energy will be advantageous. Although a wide range of different energy types are possible and available to a person skilled in the art, heat (thermal energy) is often the preferred energy source. In another embodiment of the invention, reactive coatings with two different, but complementary chemical groups can be made. This will then allow bonding two substrates with each other, which are both coated with the same coating. In some embodiments, the reactive groups form ionic bonds, iondipole interactions, hydrogen bonding, and coordination interactions, for example, metal coordination interactions.

An example of reactive group chemistries include those employing nucleophile and the electrophile group pairs such as those are listed in Table 1.

TABLE 1

Exemplary Reactive Group Pairs
For Functional Group Attachment

| Reactive Group 1 | Reactive Group 2 | Attachment |
| --- | --- | --- |
| Amine | Alkyl carbodiimide-activated ester | Amide |
| | Bromoacetamide | Amine |
| | Carboxyl | Amide |
| | Chloroacetamide | Amine |
| | Cyclic carboxylic anhydride | Amide |
| | 9-Fluorenylmethoxycarbonyl | Amide |
| | N-Hydroxysuccinimide ester | Amide |
| | Isocyanate | Urea |
| | Isothiocyanate | Thiourea |
| | Phosphate | Phosphoramide |
| | Phosphonate | Phosphonamide |
| | Sulfonate | Sulfonamide |
| Alcohol (or Thiol) | Alkyl carbodiimide-activated ester | Ester (or Thioester) |
| | Bromoacetamide | Ether (or Thioether) |
| | Carboxyl | Ester (or Thioester) |
| | Chloroacetamide | Ether (or Thioether) |
| | Cyclic carboxylic anhydride | Ester (or Thioester) |
| | Ester | Ester (or Thioester) |
| | 9-Fluorenylmethoxycarbonyl | Ester (or Thioester) |
| | N-Hydroxysuccinimide ester | Ester (or Thioester) |
| | Maleimido | Ester (or Thioester) |
| | Semicarbazido | Ester (or Thioester) |
| | Thiosemicarbazido | Ester (or Thioester) |
| | Alkyl tosylate, mesylate, brosylate, nosylate, nonaflate, triflate, or tresylate salts | Ether (or Thioether) |

Deposition of Reactive Coatings by Chemical Vapor Deposition

Functionalized poly(p-xylylenes) can be deposited via chemical vapor deposition (CVD) polymerization to generate ultra thin (20-1000 nm) films as conformal coatings and, due to the pre-defined chemical functionalities, provide a flexible solution to surface engineering challenges as they decouple surface design from bulk properties. Hence, the present technology comprises essentially a one-step coating procedure to generate functionalized surfaces without requiring any kind of post-treatment once the films are deposited. The CVD-based polymer films can be generically applied to a wide variety of substrates and establish a reactive interface that allows for further modification.

The coating is homogenously deposited on the substrate by means of CVD polymerization of poly(p-xylylene) based compounds with reactive groups, for example, amino groups, ketone groups, amine groups, alcohol groups, thiol groups, hydrazine groups, hydrazide groups and aldehyde groups. To coat a substrate with the reactive coating, starting material is pyrolyzed in the vapor phase to form the corresponding paraquinodimethanes, which condensed onto the substrate and spontaneously polymerized. During the polymerization, the temperature of the substrate is controlled to be below 45° C. The relatively low substrate temperature allows coating of temperature-sensitive substrates (e.g. poly(lactic acid)) without decomposition. Exploitation of functionalized [2.2]paracyclophanes for CVD polymerization is generally limited by the requirement to preserve integrity of the functional groups under the conditions of quinodimethane creation in the pyrolysis zone.

CVD polymerization of various functional derivatives of [2,2]paracyclophane (PCP) can undergo pyrolysis and free radical polymerization to produce poly(p-xylylene) copolymers. Each copolymer is capable of presenting two different functional groups in specified ratios.

The pyrolysis temperature is crucial for the quality of the reactive coating: pyrolysis is best conducted at a temperature above 550° C. and below 900° C. In some embodiments, when the poly(p-xylylene) copolymers are synthesized under these conditions, the chemical composition of 4-trifluoroacetyl[2.2]paracyclophane is usually in good accordance with the theoretically expected values as determined by X-ray photoelectron spectroscopy (XPS). The IR spectrum of polymer 4-trifluoroacetyl[2.2]paracyclophane confirms the presence of the intact ester bond as indicated by a characteristic signal at a wavelength of 1762 cm$^{-1}$ and the characteristic bands of C—F stretching vibrations are at wavelengths between 997 and 1036 cm$^{-1}$.

The incorporation of pentafluorophenol ester groups in the side chain of polymer 4-trifluoroacetyl[2.2]paracyclophane creates a chemically reactive interface. Immobilization of amino-containing molecules to the coated substrate does not require further activation steps, as they would have been necessary for amino- or hydroxyl-functionalized poly(p-xylylene) coatings. The absence of activation steps prevents contamination of the substrate with organic solvents and volatile chemicals and preserves some of the intrinsic advantages of CVD coatings such as low cytotoxicity due to the lack of harmful solvents, initiators, or accelerators during polymerization.

Poly(amino-p-xylylene)-co-poly(p-xylylene) interfaces include free functional groups as described above, which when contacted with another adhesion layer having a second reactive group can form a strong adhesive bond if the chemical groups are complementary, i.e. are able to form chemical bonds. In some embodiments, the first adhesive layer having a poly(-p-xylylene)-co-poly(p-xylylene) interface can include, one, or two, or three, or four functional groups for bonding with complimentary side groups from the second reactive group deposited on the second substrate.

In some embodiments, one of the substrates is deposited with an adhesion layer via chemical vapor deposition. The other adhesion layer can be deposited on the remaining substrate using a variety of deposition techniques commonly known in the art, for example: chemical deposition by spraying, dipping, sputtering, and the like.

In some embodiments, film thickness is mainly determined by the amount of poly(amino-p-xylylene)-co-poly(p-xylylene) reactive groups deposited on the substrate. In an illustrative example, the thickness of a film produced by the deposition of 30 mg of [2.2]paracyclophane 4-carboxylic acid pentafluorophenolester can be quantitatively examined by means of spectroscopic ellipsometry (SE) and is approximately 190.0(±0.5-0.8) nm. Atomic force microscopy can be used to characterize the surface topology: The root-mean square roughness is determined to be 0.4 nm.

The reactive coating shows excellent chemical stability in a dry air environment. No significant change in composition or chemical behavior is found for samples stored in a dry air atmosphere for several weeks as compared to freshly prepared samples.

Post Deposition Treatments

In some embodiments, light reactive groups, can be present in the benzoyl-functionalized poly(p-xylylenes), and can be used for bonding as well. In this embodiment, activation may occur through exposure to an energy source, for example, ambient light or through light of a specific wavelength or wavelengths range. In cases, treatment of the bonding system with energy will be advantageous. Although a wide range of different energy types are possible and available to a person skilled in the art, heat (thermal energy), UV light, plasma, corona, ion beam, electron beam, neutron beam, other particle beams, or sonication are s often the preferred energy source. In another embodiment of the invention, reactive coatings with two different, but complementary chemical groups can be made. This will then allow bonding two substrates with each other, which are both coated with the same coating.

Spacers

In some embodiments of the present technology, the devices comprising two substrates may also include spacer materials including composite materials, pastes, microgels, carbon nanotubes, adhesives, polarity modifiers, and additives placed between at least a portion of the first and second substrates.

Composite Materials

In various embodiments, the spacer can be a composite material, such as hardened plastics, microgels, carbon nanotubes, rubber materials and the like to add hardness to the space between the two substrates bonded together in at least a portion of the substrate.

Pastes

In some embodiments of the present technology, the portions of the substrates not participating in bonding may have a spacer comprising an conductive ink or paste or other composition including a conductive liquid metal, such as, for example, the liquid metal, and/or particles of, one or more metals that are capable of forming one or more intermetallic compounds with the liquid metal. In some embodiments, a paste may include liquid gallium, copper particles, and nickel particles, where the concentration of gallium may be from about 50 to 70%, the concentration of copper may be from about 0 to 40%, and the concentration of nickel may be from about 0 to 45% by weight. Such a paste may be formed, for example, at around room temperature by mechanical mixing the liquid gallium and one or more metal powders, and any desired additives, such as, for example, in an amalgamator, blender, or other mixer. In one aspect, the pastes may include small particles, such as, for example, those having an average diameter of from about 1 to 500 µm, or 25 to 100 µm. Conductive inks and pastes can be obtained, for example, from Ercon, Inc. (Wareham, Mass.), Metech, Inc. (Elverson, Pa.), E. I. du Pont de Nemours and Co. (Wilmington, Del.), Emca-Remex Products (Montgomeryville, Pa.), or MCA Services (Melbourn, Great Britain). The conductive ink is typically applied as a semi liquid or paste which contains particles of the carbon, metal, alloy, or metallic compound and a solvent or dispersant.

Additives and Chemical Crosslinkers

The spacer may also optionally include the one or more additives. The additives may modify a property, such as, for example, a thermal, electrical, adhesion or sealing property of the adhesive layers coated on the substrate. For example, the additive may include a filler material having a lower or otherwise different coefficient of thermal expansion than an adhesive layer of the coating material, such as, for example, silica particles. The silica particles may help to reduce thermal expansion and make the thermal expansion more closely approximate that of the substrate, and may help to maintain the integrity of the seal over thermal excursions or cycles. As another example, a dielectric filler or material may optionally be included in the filler to make it less electrically conducting, if appropriate. In some embodiments, the optional additive can also include cross linking agents that can be mixed with one or both of the adhesive layers to provide functional adhesion between the two substrates.

Adhesives

In some embodiments, the spacer is composed of an adhesive that adds volume and may contribute to further bonding between the two substrates. Examples of polymeric adhesives include acrylate polymers, including rubber toughened acrylate polymers and high viscosity acrylate polymers. Examples of acrylate polymers include cyanoacrylate polymers, including rubber toughened cyanoacrylate polymers and high viscosity acrylate polymers. Examples of commercially available adhesive polymers include Loctite®. 401 adhesive, Loctite® 406 adhesive, Loctite® 410 adhesive and Loctite® 411 adhesive Loctite® 770 primer adhesive, Loctite® 7701 primer adhesive, Loctite® 793 primer adhesive, Loctite® 794 primer adhesive, and Loctite® 7951 primer adhesive. (Loctite Corporation, Rocky Hill, Conn., USA). Other common adhesives suitable for use as a spacer, particularly for optical/glass substrates can include, but are not limited to, DYMAX 602 with or without 501 or 535 accelerant (available from Dymax Corporation, Torrington, Conn.), curable epoxy polymers and resins such as SCOTCHWELD 2216 epoxy (available from 3M, St. Paul, Minn.) and NORLAND 61 (available from Norland Products; Cranberry, N.J.).

Polarity Modifying Agents

In some embodiments, spacer material can also include chemical agents capable of altering the polarity of the adhesion coating. Suitable polarity modifying agents can include, acetic acid (HOAc), trifluoroacetic acid (TFA), heptafluorobutyric acid (HFBA), hexane, dichloromethane, ethanol, chloroform, ethers and tertiary amines.

Reversible Adhesion Bonding

In another embodiment of the invention, reactive coatings with two different, but complementary chemical groups can be made. This will then allow bonding two substrates with each other, which are both coated with the same coating. In an extension of this embodiment, the chemical bonding may be formed initially to ensure strong adhesion, but may be reversed by application of a secondary energy source. For instance, bounding may initially be achieved by thermal reaction between reactive groups as defined in this invention, but may be reversed by treatment with light. Examples of a reversible bond include, but are not limited to, reaction of hydrazine- and/or hydrazide-functionalized coatings with aldehyde coated substrates. A variety of reversible bond forming reactions are known to those skilled in the art and can be applied in accordance with the methods of the present technology.

EXAMPLES

Example 1

Microfluidic Devices

Microfluidics encompasses broadly the manipulation of liquids and gases in channels having cross-sectional dimensions on the order of 10-100 μm and will be a central technology in a number of miniaturized systems that are being developed for chemical, biological, and medical applications. These applications can be categorized into four broad areas: miniaturized analytical systems, biomedical devices, tools for chemistry and biochemistry, and systems for fundamental research. In order for these systems to be successful, they must have the attributes that are required for the particular application, e.g. optical properties and surface chemistry, and they must also be fabricated in materials that are inexpensive and rugged and use processes that are amenable to manufacturing. A suitable microreactor design may include an active ester coated PDMS substrate and an alcohol or thiol coated complementary second substrate (PDMS or other compatible substrate). An amino-coated PDMS substrate is utilized and optionally rinsed with ethanol. The substrates are aligned and contacted together and heated for 1-3 hours at 140° C. resulting in a simple technique for manufacturing complex devices. A solution of a biotin-conjugated mouse anti-human monoclonal antibody, is flown into the microchannel for 2 hours. Surfaces exposing patterns are incubated with a suspension of bovine aortic endothelial cells (BAECS) in serum-free Dulbecco's modified eagle medium (DMEM). After 24 h, cell attachment is studied by means of immunofluorescence microscopy. Cell nuclei are stained with bis-benzimide.

The present bonding methodology can be applied to a variety of microfluidic devices commonly known in the art, where the microfluidic device comprises a cover having two molded substrates and a lumen between the bonded substrates containing the various components and microcfluidic structures used for sensing various physical properties such as temperature, pH, chemical entities and biological components. For a representative description of microfluidic devices, please see Kayyem, U.S. Pat. No. 6,942,771; Manger, et al., U.S. Pub. Pat. App. which is incorporated herein in its entirety.

For some applications, the microfluidic devices may include integrated microfluidic structures, such as micropumps and microvalves, or external elements, e.g., pumps and switching valves, for the pumping and direction of the various fluids through the device. The structures are bonded in accordance with the present technology to one or both of the substrates forming the cover of the device. Examples of microfluidic structures are described in U.S. Pat. Nos. 5,271,724, 5,277,556, 5,171,132, and 5,375,979.

Microfluidic sensing is achievable by fabricating a device having a glass cover chemically vapor deposited with poly(4-methanamine-p-xylylene)-co-(p-xylylene) having amine reactive groups and contacted with a polymeric/elastomer gasket coated with poly(4-formyl-p-xylylene-co-p-xylylene. The gasket and the glass cover are then heated for 3 hours in an oven preheated to 140° C. The gasket can also bond to the silicon wafer containing various etched microfluidic channels immobilized with enzymes or DNA molecules for electrical sensing various biological entities such as biochemicals, and probe or target DNA molecules capable of binding and reporting specific binding with reporter molecules. The silicon wafer is similarly chemically vapor deposited with an adhesion layer (10 nm thickness) having complementary reactive groups, and bonded to a cover plate adhered with a complementary adhesive layer, to form a contained reaction chamber. The device can be exposed to laser light to quantify the reporter molecule, by shining the laser light through the glass cover.

Example 2

Micro-Electro-Mechanical Devices (MEMS)

The term "MEMS" may refer to a miniaturized or "micro" device typically having three-dimensional structure and capable of electromechanical transduction, such as, for example, mechanical motion in response to an electrical signal, and/or an electrical signal in response to mechanical motion. As used herein, the terms "microelectromechanical systems" and "MEMS" may encompass microoptoelectromechanical systems (MOEMS) that include an optical component, as well as BioMEMS. Also, the term "MEMS" may be used to refer to either a single microelectromechanical system or multiple microelectromechanical systems. The terms "microelectromechanical system" and "MEMS", as used herein, also encompass devices referred to as micromachines, for example in Japan, and/or micro systems technology (MST) devices, for example in Europe. Representative examples of MEMS can be found in Cork et al., U.S. Pat. No. 7,217,356 and Lu et al., U.S. Pub. Pat. App. 2006/0192281.

MEMS can include a cantilever beam and contact plate. A dimension of the MEMS, such as a width of the cantilever beam and/or contact plate, may be less than about a millimeter (mm, one thousandth of a meter) and more than about a micrometer (μm). Not all dimensions have to be sized so small. For example, another dimension of the MEMS, such as the length of the cantilever beam, may optionally be longer than a millimeter, if appropriate.

The substrates can be substantially hollowed out providing a chamber or lumen between the two substrates. Within the bonded substrate, one or more switches, tunable switches, cantilever beam arrays, resonators, film bulk acoustic resonators (FBARs), FBAR filters, varactors, radio-frequency MEMS, hinged mirrors, pressure sensors, tunable capacitors, accelerometers, or combinations thereof, may be sealed in the chamber. Sealing the one or more MEMS within the substrates may help to provide protection and reduce friction and corrosion. However, it is emphasized that the invention is not limited in utility to sealing MEMS within the bonded substrates. A wide variety of other types of components and materials may optionally be sealed within the substrates. Specific examples include, but are not limited to, transistors, light emitting diodes (LEDs), photodetectors, vacuums, gases, liquid crystals, and the like. In one aspect, another material, structure, or device that may benefit from being sealed in a controlled environment, such as one that is sensitive to moisture or oxygen, for example, may be included in the chamber.

One type of MEMS can include BioMEMs. A wide variety of characteristics may be sensed, such as flow rate, pH, cell type, cell antigenicity, DNA, viral or bacterial presence, cholesterol, hematocrit, cell concentration, cell count, partial pressure, or viscosity. The circuitry and components of the BioMEMS can be placed within the interior of the bonded substrates of the present technology, to provide a contained area for sampling, containment of biological liquids and fluids and to protect the reactants from contamination from the external environment.

Example 3

Devices in Vacuum and/or Space Applications

The microfluidic sensing device from Example 1 is fabricated in vacuum or in low pressure 0.1-0.5 ATM since there is no requirement for solvent to adhere the components and substrates since no pressure is required to retain significant tensile strength between the adhered components.

Example 4

Transparent Devices—Optical and Visual Recording Devices

CVD polymerization of [2.2]paracyclophane 4-carboxylic acid pentafluorophenolester results in transparent and topologically uniform polymer films having thicknesses between 1 and 2000 nm. The film thickness is mainly determined by the amount of [2.2]paracyclophane 4-carboxylic acid pentafluorophenolester used for polymerization. The thickness of a film produced by the deposition of 30 mg of [2.2]paracyclophane 4-carboxylic acid pentafluorophenolester is examined by means of spectroscopic ellipsometry (SE) and is 190.0 (±0.5-0.8)nm. Atomic force microscopy is used to characterize the surface topology: The root-mean square roughness is determined to be 0.4 nm (1 $m^2$ spot). The reactive coating shows excellent chemical stability in a dry air environment. No significant change in composition or chemical behavior is found for samples stored in a dry air atmosphere for several weeks as compared to freshly prepared samples.

Example 5

Bonding Non-Planar and Flexible Substrates

Bonding of planar substrates such as flattened plastic and metal parts to flexible substrates such as micro and nano porous membranes that selectively permit diffusion of gases or analytes can be achieved. The membrane can act as a substrate that can be partially bonded to a planar substrate for example a cylinder. The end of the cylinder can be capped with a membrane having a complementary adhesive layer containing reactive group that binds to the adhesive layer of the cylinder. The cylinder can be used as a conduit for transport of fluids or other solutions wherein the membrane can flex and balloon out without breaking due to the high tensile strength of the bonding process.

Example 6

Adhesion Strength of the Coating Materials

The ultra-thin adhesion layers are conformally applied to the substrates using a reactive coating technology described in accordance with the present technology. The CVD-based polymer films form well-adherent coatings on a range of different substrate materials including polymers, glass, silicon, metals, paper and can be stored for extended periods prior to bonding without loosing the bonding capability. In some embodiments reactive coatings used herein, poly(4-methanamine-p-xylylene)-co-(p-xylylene): 1) and poly(4-formyl-p-xylylene-co-p-xylylene) 2), are stable under dry conditions until brought in contact at elevated temperatures. Prior to mechanical testing, the chemical structures of all polymer films were confirmed by X-ray photoelectron spectroscopy (XPS). Film thicknesses were in the range of XY as measured by ellipsometry.

In a typical bonding experiment, as shown illustratively in FIG. 1, polymers 1 and 2 were deposited via CVD polymerization on different substrates and adhesion was measured using a standard tensile stress experiment (see Table 2, below). For bonding, two substrates coated with either polymer 1 or 2 were brought into conformal contact without applying additional pressure. The contacting samples were then placed in a 140° C. oven for at least 3 hr and adhesion was tested using a Bionix 100 mechanical tester (MTS, Co.) equipped with a 10N load sensor. For many of the tested substrate combinations, very high bonding strengths were measured. When bonding two PDMS substrates coated with either polymer 1 or 2, tensile stresses as high as 2.44 MPa were measured, which is identical to the fracture strengths of PDMS. Accordingly, rupture consistently did not occur at the bonding interface, but within one of the PDMS substrate. Similar results were obtained when bonding PDMS to stainless steel, silicon, or glass.

Example Poly(4-methanamine-p-xylylene)-co-(p-xylylene) and poly(4-formyl-p-xylylene-co-p-xylylene) were used as the model polymers in this stud, and were prepared by using CVD polymerization onto participating substrates. For CVD polymerization, functionalized [2,2]paracyclophane (dimer) was evaporated under a reduced pressure of 0.12 Torr at a temperature of 90-100° C. The dimmer vapor was transferred to the pyrolysis zone, which was heated to 670° C. to ensure cleavage of the C—C bonds resulting in the corresponding quinodimethanes (monomers). In the last step, monomers were adsorbed on the substrate at temperatures around 15° C. and spontaneously polymerized. The coated substrates were then brought into contact and were placed in a 140° C. oven for 3 hr or longer and an adhesion layer was formed thereafter as shown in FIG. 1.

Together with the excellent adhesion properties between the polymer and its corresponding substrate, the resulting adhesion layer was able to have an impressive bonding strength (more than 2.44 MPa). The corresponding tensile stress was tested using a mechanical tester (MTS, Co.) with a 10N load sensor. The experiments were preformed on different substrates, and the results were compared with current available methods in Table 2. Bonding strength by using CVD coatings were measured to be higher than the fracture strength (2.44 MPa) of PDMS on different substrates including PDMS, stainless steel, silicon wafer, glass, and gold. The bonding strength on the case of PDMS-PTFE substrates was found to be 1.21 MPa; though it is lower than the PDMS facture strength, it is enough for the need on fabrication using these two materials.

TABLE 2

Comparative tensile strength experiments of various bonding methodologies with CVD coatings comprising poly(4-methanamine-p-xylylene)-co-(p-xylylene) and poly(4-formyl-p-xylylene-co-p-xylylene) of various substrate materials

| Method | Material | Bonding Strength (MPa) |
|---|---|---|
| N/A | PDMS - PDMS | 0.02 |
| Heat (140° C.) | PDMS - PDMS | 0.19 |
| UV/Ozone | PDMS - PDMS | 0.72 |
| Plasma | PDMS - PDMS | 1.15 |
| CVD Coatings | PDMS - PDMS | >2.44 |
| CVD Coatings | PDMS - PTFE | 1.21 |
| CVD Coatings | PDMS - Stainless Steel | >2.44 |
| CVD Coatings | PDMS - Silicon Wafer | >2.44 |
| CVD Coatings | PDMS - Glass | >2.44 |

Figure 1:
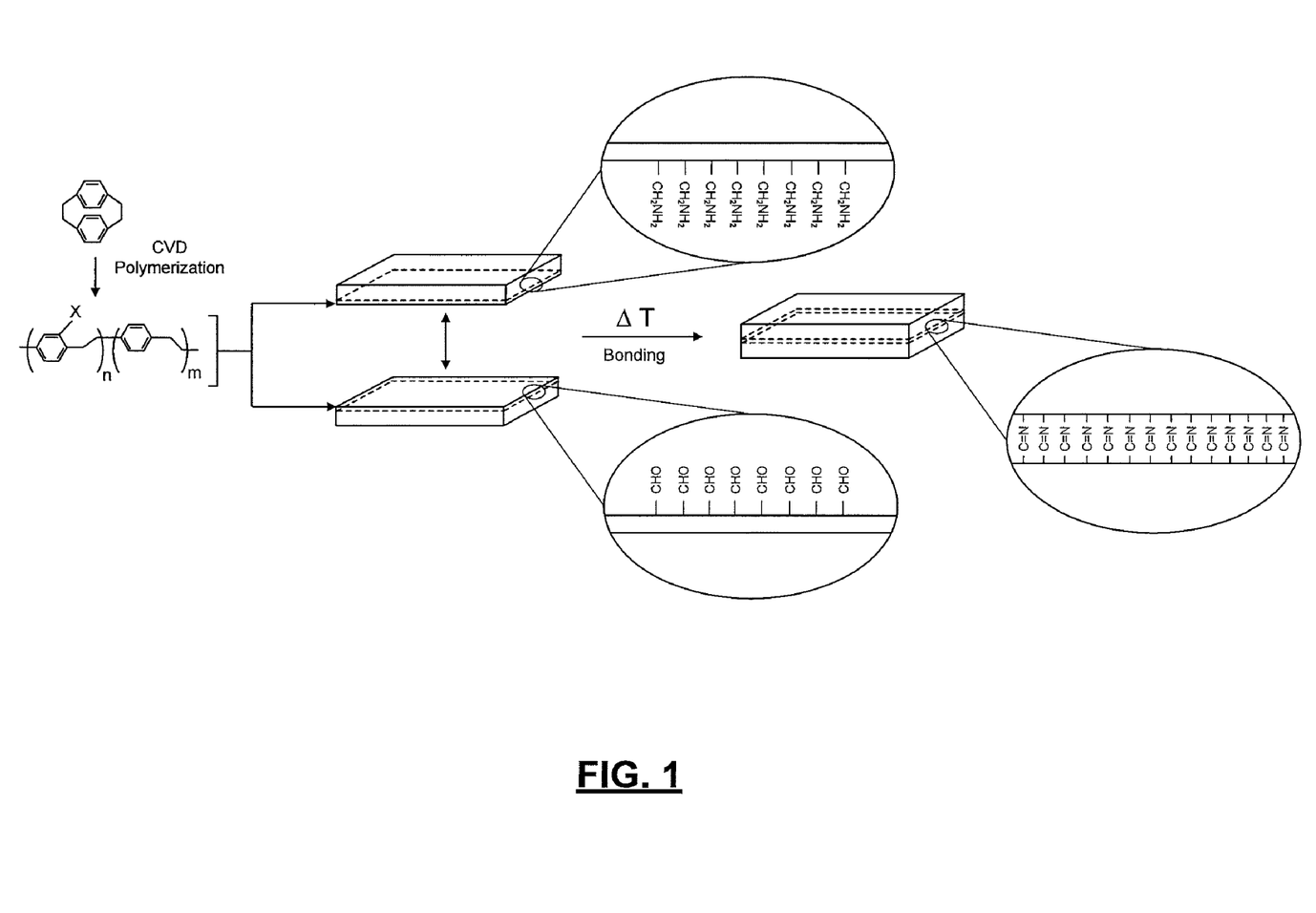
FIG. 1 illustrates the bonding procedure for bonding two or more components or substrates to one another with reactive coatings in accordance with the methods of the present invention.
Figure 2:
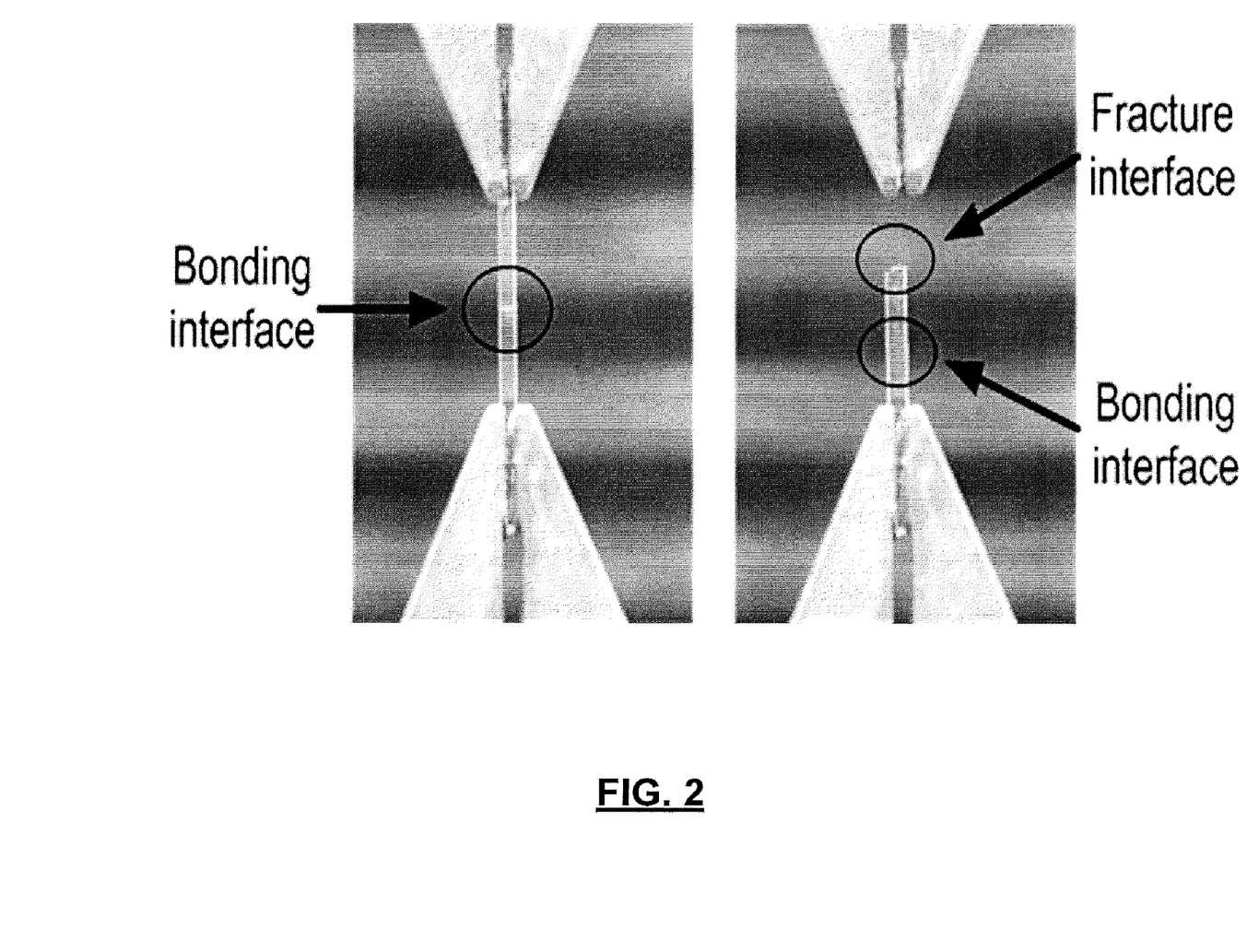
FIG. 2 is a photographic image illustrating the bonding interface of PDMS-PDMS substrates bonded in accordance with the present methods before and after fracturing.

The data demonstrates that substrate materials such as PDMS and PMDS and steel, silicon and glass have bond strengths in excess of 2.44 MPa when bonded between adhesion layers comprising imine as shown in FIG. 1. Furthermore, compared to the current adapted methods including plasma and UV/ozone treatment, the present technology shows remarkable boning strength (larger than 2.24 MPa, which is the fracture strength of PDMS as shown in FIG. 2).

Other methods commonly used by one of ordinary skill in the art to test the tensile strength of the present bonding technology described herein include American Society for Testing and Materials (ASTM) D897-01e1 Standard Test Method for Tensile Properties of Adhesive Bonds.

What is claimed is:

1. A method of bonding comprising:
   a. providing a first substrate;
   b. providing a second substrate;
   c. depositing a first adhesion layer upon at least a portion of at least one of said first substrate using chemical vapor deposition, said first adhesion layer having a first reactive group;
   d. depositing a second adhesion layer upon at least a portion of said second substrate to form a second adhesion layer, said second adhesion layer having a second reactive group, wherein said first reactive group is distinct from said second reactive group and said first reactive group is complementary with said second reactive group, wherein at least one of said first adhesion layer or said second adhesion layer comprises poly(p-xylylene); and
   e. contacting said first adhesion layer with said second adhesion layer causing a reaction between said first reactive group and said second reactive group to form an adhesion bond between said first substrate and said second substrate, thereby providing an adhered article.

2. The method according to claim 1, wherein said depositing said second adhesion layer upon at least a portion of said second substrate comprises chemical vapor deposition of said second adhesion layer, wherein each of said first and second adhesion layers comprise poly(p-xylylene) with said first reactive group and said second reactive group, respectively.

3. The method according to claim 2, wherein said poly(p-xylylene) of said first adhesion layer, said second adhesion layer, or both said first adhesion layer and said second adhesion layer, is selected from the group consisting of poly(4-methanamine-p-xylylene-co-p-xylylene), poly(4-formyl-p-xylylene-co-p-xylylene), poly(p-xylylene carboxylic acid pentafluorophenol ester-co-p-xylylene), poly(p-xylylene-2, 3-dicarboxylic acid anhydride) and combinations thereof.

4. The method according to claim 2, wherein said first reactive group, said second reactive group, or both said first and second reactive groups are selected from the group consisting of: H, $NH_2$, $(CH_2)_nNH_2$, OH, SH, $NH-NH_2$, $CO-NH-NH_2$, CCH, $N_3$, $OSO_2CF_3$, $(CH_2)_nSO_2CF_3$, $OSO_2C_5F_5$, $(CH_2)_nSO_2C_5F_5$, $CH_2OCH_2$, COOX, $CH_3$ $(COO)_2X$, CHO, $(CH_2)_nCHO$, $CF_3$, $C_nF_{2n+1}$, azlactone, NHS, and combinations thereof.

5. The method according to claim 1, further comprising placing a spacer between at least a portion of said first adhesion layer and said second adhesion layer.

6. The method according to claim 5, wherein said placing a spacer between at least a portion of said first adhesion layer and second adhesion layer comprises placing a spacer selected from the group consisting of an adhesive, a carbon nanotube, a hydrogel, a paste, a composite material and combinations thereof.

7. The method according to claim 1, wherein said first reactive group and said second distinct reactive group are selected from the group consisting of: hydrogen, amino, aldehyde, ketone, ester, amine, amide, alcohol, thiol, thioisocyanate, isocyanate, hydrazine, hydrazide, phosphonate, phosphate, alcohol, hydroxyl, methoxyl, benzoyl, epoxide, acetate, carboxymethyl, anhydride, lactone, pentafluorophenol ester, trifluoroacetate, trifluoromethyl ketone, trifuoromethanesulfonate, alkyl tosylate, mesylate, brosylate, nosylate, nonaflate, triflate, or tresylate salts, thiosemicarbazido, semicarbazido, maleimido N-Hydroxysuccinimide ester (NHS) and combinations thereof.

8. The method according to claim 7, wherein said first reactive group is an amino and said second reactive group is an aldehyde.

9. The method according to claim 1, wherein said contacting said first layer with said second adhesion layer causing a reaction between said first reactive group and said second reactive group comprises contacting said first adhesion layer with said second adhesion layer causing a chemical bond selected from the group consisting of a covalent bond, an ionic bond, a hydrogen bond, a metal coordination bond and combinations thereof between said first reactive group and said second reactive group.

10. The method according to claim 1, further comprising pretreating at least one of said first substrate and said second substrate with any one or more of: cold gas plasmas, such as oxygen, hydrogen, nitrogen, ammonia, carbon dioxide, ethylene, acetylene, propylenes, butylenes, ethanol, acetone, sulfur dioxide or mixtures thereof.

11. The method according to claim 1, further comprising heating said adhered article for a period of time ranging from about 0.5 hours to about 24 hours in an oven set to a temperature ranging from about 50° C. to about 300° C.

12. The method according to claim 1, further comprising applying an energy source to said adhered article said energy source selected from the group consisting of: ambient light, monochromatic light, actinic radiation and combinations thereof.

13. The method according to claim 1, wherein said first adhesion layer is a surface of said first substrate.

14. The method according to claim 1, wherein depositing an adhesion layer upon at least a portion of said second substrate to form a second adhesion layer comprises depositing an adhesion layer upon at least a portion of said second substrate using chemical vapor deposition to form said second adhesion layer.

15. The method according to claim 1, wherein said first substrate and said second substrate are each selected from the group consisting of plastic, thermoplastics polyalkylpterephthalates, polysiloxanes, metals, minerals, ceramics, membranes, gels, glasses and combinations thereof.

16. The method according to claim 1, wherein said first substrate comprises PDMS and said second substrate comprises glass.

17. The method according to claim 1, wherein at least one of the first adhesion layer or the second adhesion layer further comprises a polarity modifying component.

18. The method according to claim 1, wherein said first reactive group is selected from a hydrazine and/or hydrazide group and said second reactive group is an aldehyde, wherein said reaction is reversible.

19. A method of bonding substrates, the method comprising:
   a. depositing via chemical vapor deposition a first adhesion layer to at least a portion of a first substrate, wherein said first adhesion layer comprises poly(p-xylylene) comprising a first reactive group;
   b. depositing via chemical vapor deposition a second adhesion layer to at least a portion of a second substrate, wherein said second adhesion layer comprises poly(p-xylylene) comprising a second reactive group that is distinct from said first reactive group and said first and said second reactive groups are complementary with one another;
   c. contacting said first adhesion layer with said second adhesion layer so that said first reactive group interacts with said second reactive group to form an adhesion bond having a bond strength that is greater than or equal to a fracture strength of either of said first substrate or said second substrate.

20. A method of bonding substrates, the method comprising:
   a. depositing via chemical vapor deposition a first adhesion layer to at least a portion of a first substrate, wherein said first adhesion layer comprises a first reactive group selected from the group consisting of: amine, alcohol, and thiol;
   b. depositing via chemical vapor deposition a second adhesion layer to at least a portion of a second substrate, wherein said second adhesion layer comprises a second reactive group that is complementary with said first reactive group, wherein said second reactive group is selected from the group consisting of: alkyl carbodiimide-activated ester, bromoacetamide, carboxyl, chloroacetamide, cyclic carboxylic anhydride, 9-fluorenylmethoxycarbonyl, N-hydroxysuccinimide ester, isocyanate, isothiocyanate, phosphate, phosphonate, sulfonate, alkyl carbodiimide-activated ester, ester, maleimido, semicarbazido, thiosemicarbazido, and alkyl tosylate, mesylate, brosylate, nosylate, nonaflate, triflate, or tresylate salts;
   c. contacting said first adhesion layer with said second adhesion layer so that said first reactive group interacts with said second reactive group to form an adhesion bond between said first substrate and said second substrate.

* * * * *

UNITED STATES PATENT AND TRADEMARK OFFICE
CERTIFICATE OF CORRECTION

| | | |
|---|---|---|
| PATENT NO. | : 7,947,148 B2 | Page 1 of 1 |
| APPLICATION NO. | : 11/756890 | |
| DATED | : May 24, 2011 | |
| INVENTOR(S) | : Joerg Lahann et al. | |

It is certified that error appears in the above-identified patent and that said Letters Patent is hereby corrected as shown below:

Title Page, Item (57), Abstract, line 1, after "deposition", insert --of--.

Column 1, line 34, after "fabrication", insert --of--.

Column 1, line 40, after "limited to", delete "a".

Column 1, line 53, after "of", delete "a".

Column 3, line 5, "has" should be --which have--.

Column 3, line 46, "molybdeumn" should be --molybdenum--.

Column 4, line 66, "$F_{22n+1}$" should be --$F_{2n+1}$--.

Column 5, line 36, after "those", delete "are".

Column 6, line 33, "[2,2]" should be --[2.2]--.

Column 7, line 3, "complimentary" should be --complementary--.

Column 7, line 37, after "are", delete "s".

Column 7, line 59, "an conductive" should be --a conductive--.

Column 8, line 43, after "Loctite®", delete ".".

Column 8, line 45, after first occurrence of "adhesive", insert --,--.

Column 9, line 5, "bounding" should be --bonding--.

Column 10, line 5, after second occurrence of "xylylene", insert --)--.

Column 12, line 5, "loosing" should be --losing--.

Column 12, line 32, "substrate" should be --substrates--.

Column 12, line 40, "[2,2]" should be --[2.2]--.

Column 12, line 41, "(dimer)" should be --(dimmer)--.

Signed and Sealed this
Thirtieth Day of October, 2012

David J. Kappos
*Director of the United States Patent and Trademark Office*